(12) United States Patent
Carling et al.

(10) Patent No.: US 9,811,708 B2
(45) Date of Patent: Nov. 7, 2017

(54) METHOD AND FINGERPRINT SENSING DEVICE WITH FINGER LOST DETECTION

(71) Applicant: Fingerprint Cards AB, Göteborg (SE)

(72) Inventors: David Carling, Mölndal (SE); Hans Thörnblom, Kungsbacka (SE)

(73) Assignee: FINGERPRINT CARDS AB, Göteborg (SE)

( * ) Notice: Subject to any disclaimer, the term of this patent is extended or adjusted under 35 U.S.C. 154(b) by 7 days.

(21) Appl. No.: 15/176,622

(22) Filed: Jun. 8, 2016

(65) Prior Publication Data

US 2017/0098109 A1  Apr. 6, 2017

(30) Foreign Application Priority Data

Oct. 2, 2015 (SE) ...................... 1551263

(51) Int. Cl.
*G06K 9/00* (2006.01)
(52) U.S. Cl.
CPC ........... *G06K 9/0002* (2013.01); *G06K 9/001* (2013.01)
(58) Field of Classification Search
None
See application file for complete search history.

(56) References Cited

U.S. PATENT DOCUMENTS

| 8,031,046 | B2 | 10/2011 | Franza et al. | |
|---|---|---|---|---|
| 2008/0030302 | A1* | 2/2008 | Franza | G06K 9/00006 340/5.83 |
| 2012/0092293 | A1* | 4/2012 | Ganapathi | G02B 26/0833 345/174 |
| 2012/0328170 | A1* | 12/2012 | Wu | G06K 9/00046 382/124 |
| 2013/0076485 | A1* | 3/2013 | Mullins | G06F 21/32 340/5.83 |

OTHER PUBLICATIONS

Thomas A. Kinney, Proximity Sensors Compared: Inductive, Capacitive, Photoelectric, and Ultrasonic; Sep. 1, 2001.*

* cited by examiner

*Primary Examiner* — Sumati Lefkowitz
*Assistant Examiner* — Jiangeng Sun
(74) *Attorney, Agent, or Firm* — RMCK Law Group, PLC

(57) ABSTRACT

The present invention relates to a fingerprint sensing device comprising an array of sensing elements; readout circuitry connected to the array of sensing elements; and finger detecting circuitry for detecting if a finger candidate is touching the sensing surface of the fingerprint sensing device. The fingerprint sensing device is controllable between an active state and an inactive state. When the fingerprint sensing device is in the inactive state, the finger detecting circuitry is configured to provide a finger lost signal for indicating when the finger candidate no longer touches the sensing surface of the fingerprint sensing device.

15 Claims, 6 Drawing Sheets

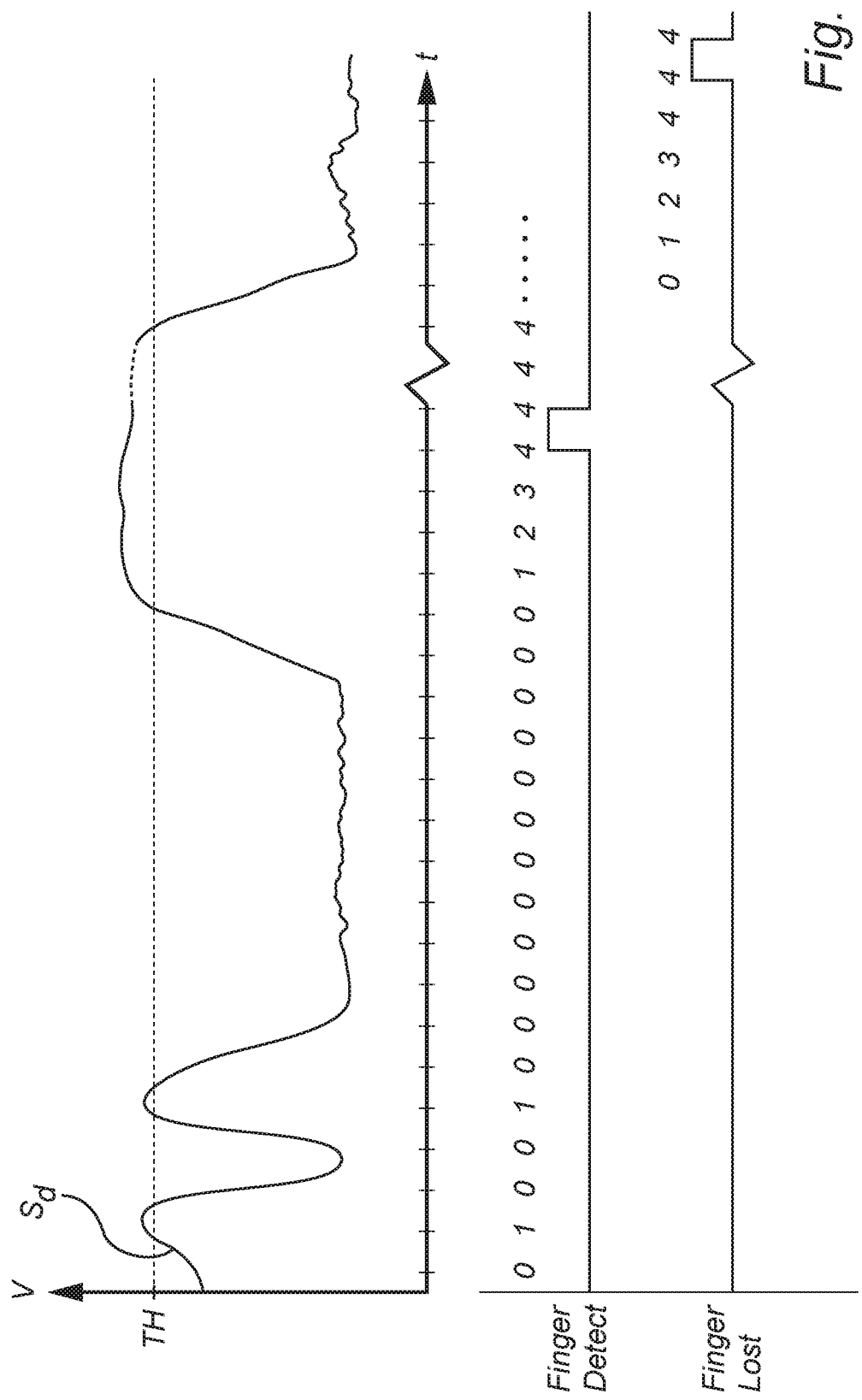

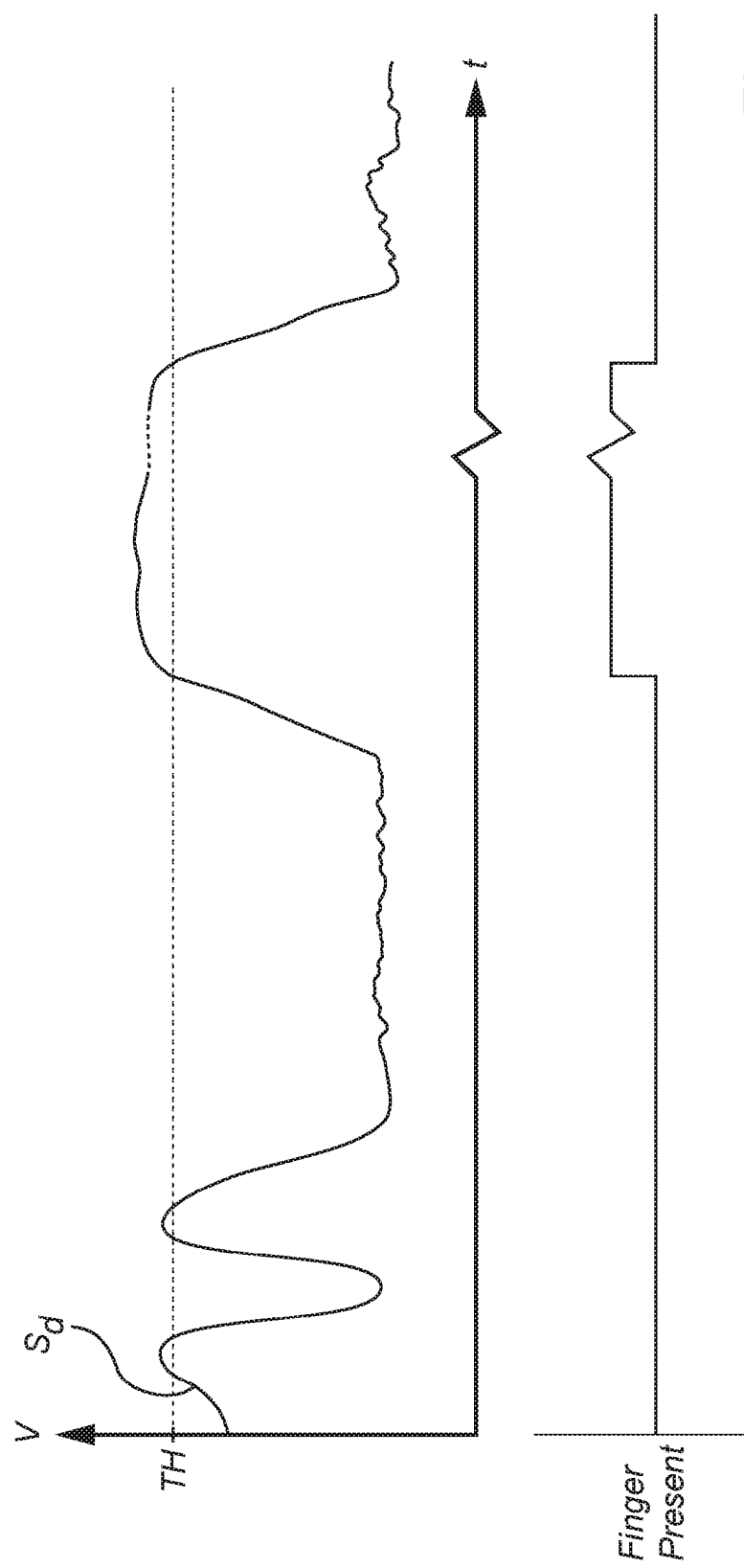

METHOD AND FINGERPRINT SENSING DEVICE WITH FINGER LOST DETECTION

CROSS REFERENCE TO RELATED APPLICATIONS

This application claims the benefit of Swedish Patent Application No. 1551263-5 filed Oct. 2, 2015. The disclosure of the above application is incorporated herein by reference in its entirety.

FIELD OF THE INVENTION

The present invention relates to a fingerprint sensing device and to a method of sensing a fingerprint pattern.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

To provide for a low energy consumption of the fingerprint sensing system, the fingerprint sensing system should only operate when there is a finger on the fingerprint sensing device comprised in the fingerprint sensing system. On the other hand, the fingerprint sensing system may be required to independently determine whether or not a finger is present on the sensing device and to sense the fingerprint pattern of the finger when the finger is placed on the sensing device.

U.S. Pat. No. 8,031,046 discloses a finger sensing device in which finger sensing electrodes may be bussed together and connected to a bussed electrode amplifier which is typically maintained on. A sample and hold and decoder circuit is connected to the bussed electrode amplifiers and may output an average power from the bussed group of electrodes that is compared with a threshold level. If the average power is higher than the threshold level, it is determined that the finger is present, and a fingerprint image is acquired.

Although the solution proposed by U.S. Pat. No. 8,031,046 seems to provide for a rather energy-efficient finger detect functionality, there still appears to be room for improvement.

SUMMARY OF THE INVENTION

In view of the above-mentioned and other drawbacks of the prior art, it is an object of the present invention to achieve an improved fingerprint sensing device and method of sensing a fingerprint pattern, in particular providing for more energy efficient operation of the fingerprint sensing device.

According to a first aspect of the present invention, it is therefore provided a fingerprint sensing device for sensing a fingerprint pattern of a finger touching a sensing surface of the fingerprint sensing device, and providing a representation of the fingerprint pattern, the fingerprint sensing device comprising: an array of sensing elements for sensing the fingerprint pattern; readout circuitry connected to the array of sensing elements; and finger detecting circuitry for detecting if a finger candidate is touching the sensing surface of the fingerprint sensing device, the fingerprint sensing device being controllable between an active state with an active state energy consumption and an inactive state with an inactive state energy consumption lower than the active state energy consumption, wherein: when the fingerprint sensing device is in the active state, each sensing element in the array of sensing elements is controllable to provide a sensing signal indicating a local distance between the finger and the sensing element; and the finger readout circuitry is controllable to read out the sensing signals from each of the sensing elements and provide the representation of the fingerprint pattern based on the sensing signals from the sensing elements; and when the fingerprint sensing device is in the inactive state, the finger detecting circuitry is configured to provide a finger lost signal for indicating when the finger candidate no longer touches the sensing surface of the fingerprint sensing device.

The sensing elements may, for example, be capacitive sensing elements, each providing a measure indicative of the capacitive coupling between that particular sensing element and a finger surface touching the sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a fingerprint sensing device comprising sensing elements utilizing a particular fingerprint sensing technology, but are equally applicable to, for instance, optical, thermal or piezo-electric fingerprint sensors etc.

The sensing surface may be a top surface of a protective coating, and the sensing elements may sense the fingerprint pattern through the protective coating. In embodiments, the protective coating may comprise a glass cover sheet.

The readout circuitry may, for instance, comprise circuitry for receiving a sensing signals provided by the sensing elements and, where applicable, analog-to-digital converting circuitry for converting analog sensing signals to a digital representation of the fingerprint pattern.

By the term "finger candidate" should be understood an object that may be a finger. In particular, a "finger candidate" may be sufficiently similar to a real finger to transition the fingerprint sensing device from its inactive state to its active state. For instance, a finger candidate may have a conductivity similar to a real finger. Of course, a "finger candidate" may typically be a real finger.

In its "inactive" state, the fingerprint sensing device may have a very limited functionality. For instance, the fingerprint sensing device may not be capable of sensing and providing externally a full fingerprint image. In the inactive state, the current consumption of the fingerprint sensing device may be in the order of $\mu A$.

In its "active" state, the fingerprint sensing device may acquire and provide externally fingerprint images. In the active state, the current consumption of the fingerprint sensing device may be in the order of mA.

The finger detecting circuitry may be dedicated finger detecting circuitry, or a set of the sensing elements may be used as finger detecting circuitry. Further, the finger candidate detection carried out by the finger detecting circuitry may be based directly on an analog detecting signal and/or on a digital representation of the analog detecting signal.

The sensed fingerprint pattern may be used for various purposes, such as biometric enrollment or authentication, or fingerprint pattern based navigation etc.

The present invention is based upon the realization that the average power consumption of an electronic device comprising a fingerprint sensing device can be reduced if the fingerprint sensing device can indicate the end of a finger candidate touch. The present inventors have further realized that it is particularly advantageous if the fingerprint sensing device can indicate the end of a finger candidate touch when the fingerprint sensing device is in its inactive state. This can, for example, be used for preventing repeated image acquisitions of a finger candidate that has already been evaluated and found to be false and/or of insufficient quality. In addition, in the event of a failed authentication, the fingerprint sensing device may be controlled to its inactive state and prevented from providing a new fingerprint representation (such as a fingerprint image) until the finger has been removed from the surface of the fingerprint sensor and placed there again.

To even further reduce the risk of unwanted repeated image acquisitions, the finger detecting circuitry may be configured to provide the finger lost signal only when the finger candidate has been moved well away from the sensing surface, such as at least one millimeter away.

According to various embodiments, the finger detecting circuitry may further be configured to provide, when the fingerprint sensing device is in its inactive state, a finger detect signal for indicating when the finger candidate is touching the sensing surface of the fingerprint sensing device.

Moreover, the fingerprint sensing device may advantageously comprise a finger detection output for externally providing the finger lost signal (and/or the finger detect signal where applicable).

The finger lost signal (and/or the finger detect signal) may be provided as a digital interrupt signal. This will allow a host system to take appropriate action, such as to control the fingerprint sensing device to its active state and control the fingerprint sensing device to acquire a fingerprint candidate representation for further evaluation. Alternatively or in combination, the fingerprint sensing device may control itself from its inactive state to its active state in response to the output of the finger detecting circuitry.

According to embodiments, the finger detecting circuitry may be configured to detect if the finger candidate is touching the sensing surface of the fingerprint sensing device at discrete detecting events.

In such embodiments, for increasing the accuracy in the output from the finger detecting circuitry, the finger lost signal may only be provided when the finger detecting circuitry detects that the finger candidate no longer touches the sensing surface of the fingerprint sensing device at at least two consecutive detecting events.

Analogously, in embodiments where the finger detecting circuitry is further configured to provide the above-mentioned finger detect signal, the finger detect signal may only be provided when the finger detecting circuitry detects that the finger candidate touches the sensing surface of the fingerprint sensing device at at least two consecutive detecting events.

According to various embodiments, furthermore, the sensing signal from each of the sensing elements may indicate a capacitive coupling between the finger and the sensing element.

In these embodiments, each of the sensing elements may comprise: a conductive sensing structure; and a charge amplifier connected to the sensing structure for providing the sensing signal indicating a change of a charge carried by the sensing structure, resulting from a change in a potential difference between the sensing structure and the finger.

Moreover, the fingerprint sensing device may further comprise an electrically conductive finger detecting structure; and the finger detecting circuitry may be configured to provide the finger lost signal in response to the capacitive coupling between the finger detecting structure and the finger candidate changing from a first value above a threshold capacitive coupling to a second value below the threshold capacitive coupling. The threshold capacitive coupling may, for example, be represented by a threshold voltage. Furthermore, the threshold capacitive coupling may be predefined, or it may be determined dynamically based on a sensed signal. For instance, the threshold capacitive coupling may be based on a sensed noise level.

In embodiments, in order to further reduce the risk of unwanted repeated image acquisitions, the first value may be above a first threshold capacitive coupling, and the second value may be below a second threshold capacitive coupling, the second threshold capacitive coupling being weaker than the first threshold capacitive coupling.

In these embodiments, the first threshold capacitive coupling may indicate that the finger candidate is in contact with the sensing surface, and the second threshold capacitive coupling may indicate that the finger candidate can still be detected by the finger detecting circuitry, but that there is air between the finger candidate and the sensing surface, such as at least one millimeter or more between the finger candidate and the sensing surface.

The fingerprint sensing device according to various embodiments of the present invention may advantageously be comprised in an electronic device, further including processing circuitry for controlling operation of the electronic device; and a fingerprint sensor interface for allowing the processing circuitry to control operation of the fingerprint sensing device, wherein the processing circuitry is configured to: control the fingerprint sensing device to provide a first candidate representation of a finger candidate to the processing circuitry via the fingerprint sensor interface; evaluate the first candidate representation; and control, when the evaluation indicates that the finger candidate cannot be qualified as a finger, the fingerprint sensing device to provide a second candidate representation of the finger candidate only after the finger detecting circuitry has provided the finger lost signal.

The processing circuitry may be realized as hardware and/or as software running on one or several processors.

When the evaluation of the first candidate representation indicates that the finger candidate cannot be qualified as a finger, the processing circuitry may, for instance, control the fingerprint sensing device to provide a second candidate representation only after finger lost detection by configuring the fingerprint sensing device to first indicate that the finger candidate no longer touches the sensor surface, and then proceeding to control the fingerprint sensing device provide a new, second candidate representation the next time a finger candidate is placed on the sensor surface. Alternatively, the processing circuitry may configure the fingerprint sensing device to indicate to the processing circuitry when it is first detected that a new finger candidate is detected. The processing circuitry may then proceed to control the fingerprint sensing device to acquire a new candidate representation.

Accordingly, the finger lost signal may, depending on the configuration of the fingerprint sensing device, be provided externally from the fingerprint sensing device to the processing circuitry via the fingerprint sensor interface, or internally in the fingerprint sensing device. In the latter case, the finger lost signal may, for example, be provided to the readout circuitry (state machine) of the fingerprint sensing device.

In embodiments, the processing circuitry may advantageously be further configured to control the fingerprint sensing device to its inactive state when the evaluation indicates that the finger candidate cannot be qualified as a finger.

The fingerprint sensing device will then consume much less energy than in its active state as long as there is an "unqualified" finger candidate touching the sensor surface.

According to various embodiments, the electronic device may further comprise a display device; and the processing circuitry may further be configured to, when the evaluation indicates that the finger candidate can be qualified as a finger: retrieve a stored enrolment representation; form an authentication representation based on the first candidate representation; compare the enrolment representation and the authentication representation; and when the comparison indicates successful authentication: activating the display device; and controlling the display device to indicative the successful authentication to a user.

According to a second aspect of the present invention, there is provided a method of controlling operation of a fingerprint sensing device comprising finger detecting circuitry, the fingerprint sensing device being controllable between an active state with an active state energy consumption and an inactive state with an inactive state energy consumption lower than the active state energy consumption, wherein the method comprises the steps of: detecting, when the fingerprint sensing device is in its inactive state, using the finger detecting circuitry, if a finger candidate is touching a sensing surface of the fingerprint sensing device; providing, when the finger candidate is touching the sensing surface of the fingerprint sensing device, a finger detect signal; and providing, when the finger candidate no longer touches the sensing surface of the fingerprint sensing device, a finger lost signal.

The method steps of the method according to embodiments of this second aspect of the invention may be included in a method of controlling an electronic device including: a fingerprint sensing device for sensing a fingerprint pattern of a finger touching a sensing surface of the fingerprint sensing device, the fingerprint sensing device being controllable between an active state with an active state energy consumption and an inactive state with an inactive state energy consumption lower than the active state energy consumption; processing circuitry for controlling operation of the electronic device; and a fingerprint sensor interface for allowing the processing circuitry to control operation of the fingerprint sensing device. In addition, this method of controlling such an electronic device comprises the steps of: controlling the fingerprint sensing device to provide a first candidate representation of a finger candidate to the processing circuitry via the fingerprint sensor interface; evaluating the representation of the fingerprint pattern; and controlling, when the evaluation indicates that the finger candidate cannot be qualified as a finger, the fingerprint sensing device to provide a second candidate representation of the finger candidate only after the finger detecting circuitry has provided the finger lost signal.

Further embodiments of, and effects obtained through this second aspect of the present invention are largely analogous to those described above for the first aspect of the invention.

In summary, the present invention relates to a fingerprint sensing device comprising an array of sensing elements; readout circuitry connected to the array of sensing elements; and finger detecting circuitry for detecting if a finger candidate is touching the sensing surface of the fingerprint sensing device. The fingerprint sensing device is controllable between an active state and an inactive state. When the fingerprint sensing device is in the inactive state, the finger detecting circuitry is configured to provide a finger lost signal for indicating when the finger candidate no longer touches the sensing surface of the fingerprint sensing device.

BRIEF DESCRIPTION OF THE DRAWINGS

These and other aspects of the present invention will now be described in more detail, with reference to the appended drawings showing an example embodiment of the invention, wherein:

FIG. 5 schematically shows a first example of signals indicating the presence of a finger candidate on the sensor surface; and FIG. 6 schematically shows a second example of signals indicating the presence of a finger candidate on the sensor surface.

DETAILED DESCRIPTION OF EXAMPLE EMBODIMENTS

In the present detailed description, various embodiments of the electronic device according to the present invention are mainly discussed with reference to a mobile phone with an elongated fingerprint sensor being accessible through an opening in the back cover.

It should be noted that this by no means limits the scope of the present invention, which equally well includes, for example, other types of electronic devices, such as laptop computers etc. Furthermore, the fingerprint sensing device need not be elongated, but could be substantially square. Moreover, the fingerprint sensing device may be arranged in any suitable location in the electronic device, such as being integrated with a button on the front or the side of the mobile phone, or arranged under a cover glass etc.

Figures 1A, 1B:
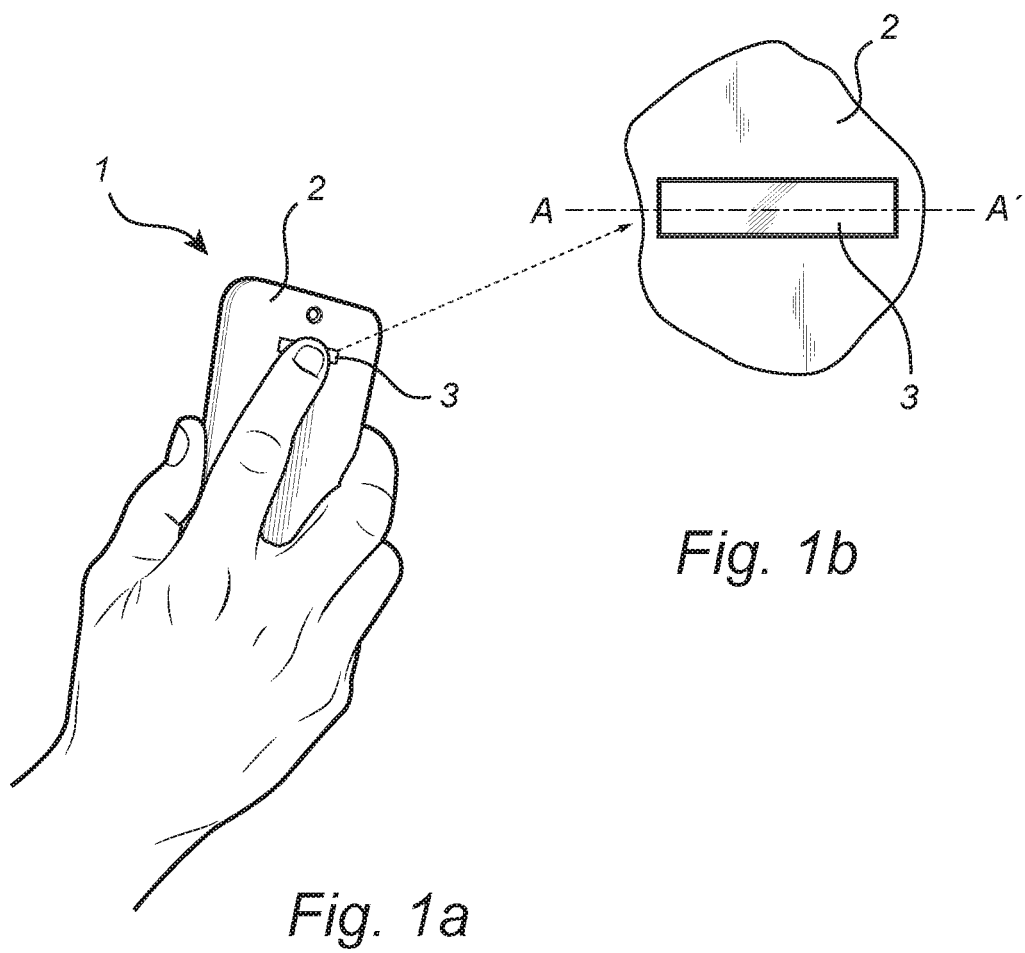
FIGS. 1a-b schematically illustrate an electronic device including a fingerprint sensing device according to an example embodiment of the present invention.

FIG. 1a schematically illustrates an example embodiment of the electronic device according to the present invention, in the form of a mobile phone 1 having a housing 2 and an integrated fingerprint sensor 3 being accessible through an opening in the housing 2. The fingerprint sensor 3 may, for example, be used for unlocking the mobile phone 1 and/or for authorizing transactions carried out using the mobile phone etc.

FIG. 1b is an enlarged view of the fingerprint sensor 3 and its integration with the housing 2.

Figure 2:
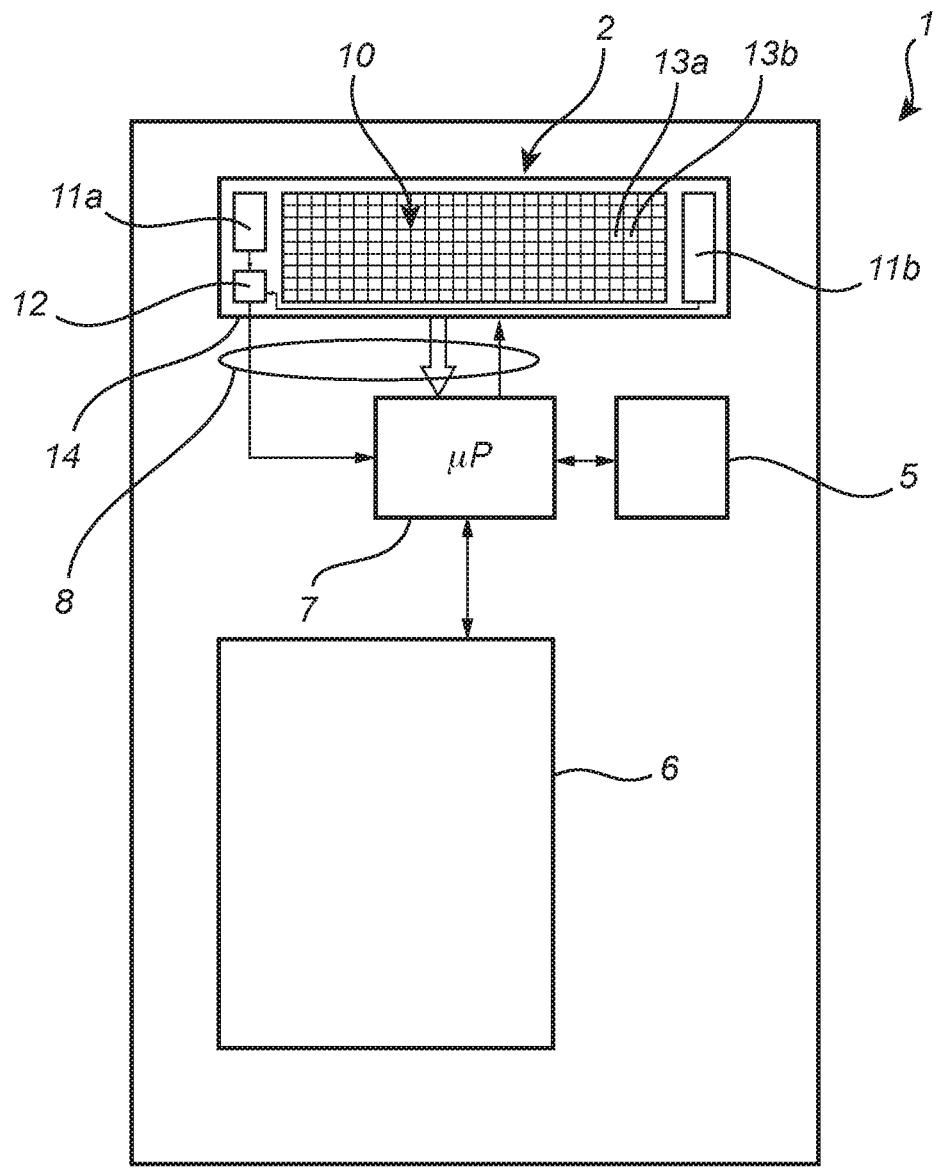
FIG. 2 is a block diagram of the electronic device in FIGS. 1a-b.

With reference to FIG. 2, which is a schematic block-diagram of the mobile phone is FIG. 1a, the mobile phone 1, in addition to the above-mentioned fingerprint sensor 3, comprises communication circuitry 5, user interface circuitry 6, processing circuitry 7, and a fingerprint sensor interface 8, here schematically indicated by the line arrows indicating control signals and the block arrow indicating data transfer.

As is schematically indicated in FIG. 2, the fingerprint sensor 3 comprises a sensor array 10 and finger detecting circuitry, here provided in the form of finger detecting structures 11a-b and a finger detection circuit 12 connected to the finger detecting structures 11a-b. The sensor array 10 includes a plurality of sensing elements 13a-b (only two neighboring sensing elements are indicated with reference numerals in FIG. 2 to avoid cluttering the drawing). The fingerprint sensor 3 further comprises a finger detection output 14 for externally providing a Finger Detect and/or a Finger Lost signal from the finger detection circuit 12. Although not shown in FIG. 2, the fingerprint sensing device 3 additionally comprises readout circuitry for converting sensing signals from the sensing elements to provide a representation of a fingerprint (or the surface structure of another object) touching the sensor surface. Exemplary readout circuitry will be described further below with reference to FIG. 3.

The above-mentioned communication circuitry 5 may, for example, comprise one or several of various antennas and control units for wireless communication, and the above-mentioned user interface circuitry 6 may, for example, comprise one or several of a display, a microphone, a speaker, and a vibration unit.

Figure 3:
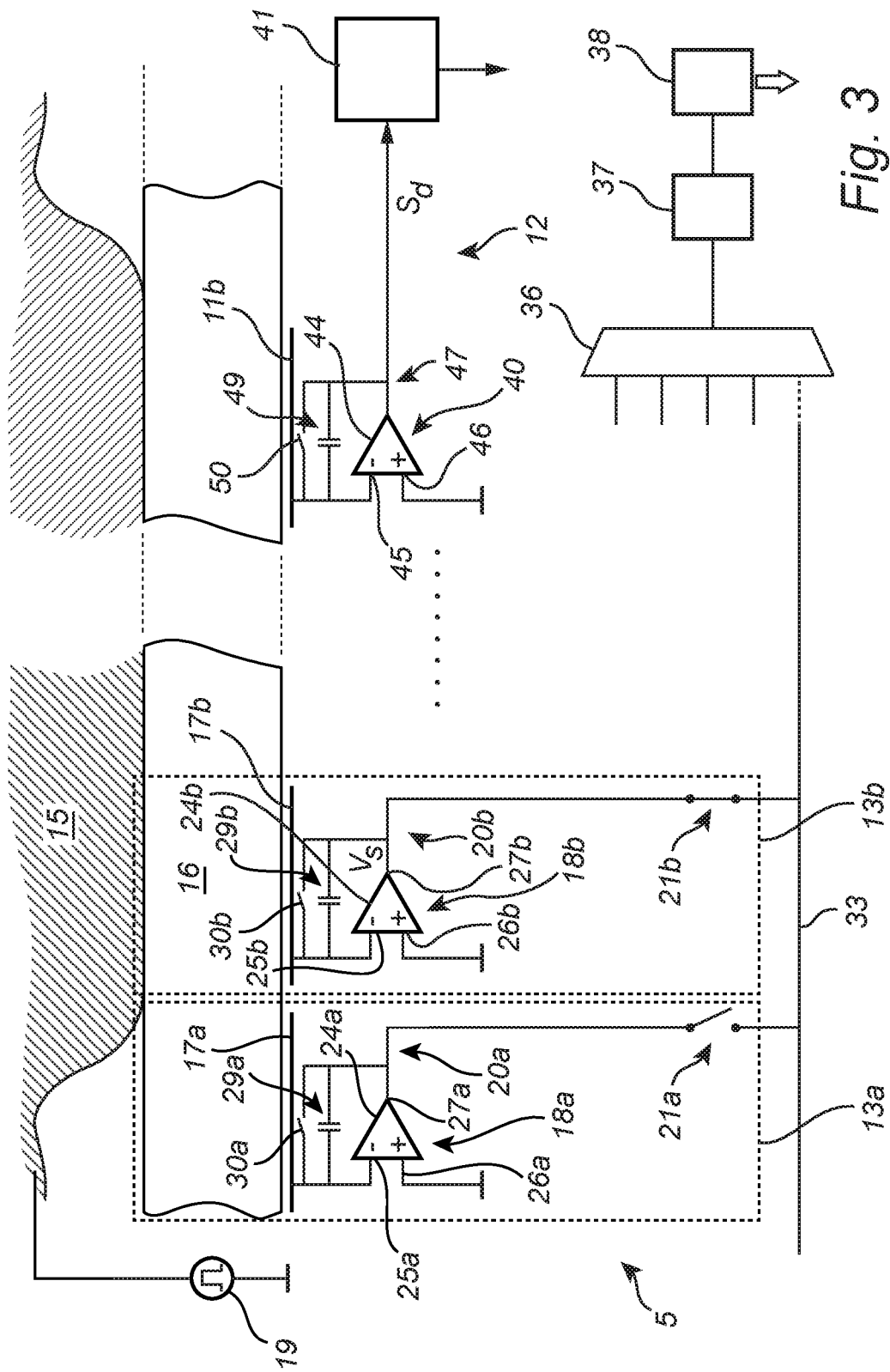
FIG. 3 is a schematic cross-section view of a portion of the fingerprint sensing device in FIG. 1b.

FIG. 3 is a schematic cross section of a portion of the fingerprint sensing device 3 in FIG. 1b taken along the line A-A' with a finger 15 placed on top of a protective dielectric top layer 16 covering the sensor array 5 and the finger detecting structures 11a-b. Referring to FIG. 3, the fingerprint sensing device 3 comprises an excitation signal providing circuit 19 electrically connected to the finger via a conductive finger drive structure (not shown in FIG. 3), a plurality of sensing elements 13a-b, and a finger detection arrangement comprising the finger detecting structure 11b, and the finger detection circuit 12 connected to the finger detecting structure 11b.

As is schematically indicated in FIG. 3, each sensing element 13a b comprises a conductive sensing structure, here in the form of a metal plate 17a-b underneath the protective dielectric top layer 16, a charge amplifier 18a-b, and selection circuitry, here functionally illustrated as a simple selection switch 21a-b for allowing selection/activation of the respective sensing element 13a-b.

The charge amplifier 18a-b comprises at least one amplifier stage, here schematically illustrated as an operational amplifier (op amp) 24a-b having a first input (negative input) 25a-b connected to the sensing structure 17a b, a second input (positive input) 26a-b connected to sensor ground or another reference potential, and an output 27a-b. In addition, the charge amplifier 18a-b comprises a feedback capacitor 29a-b connected between the first input 25a-b and the output 27a-b, and reset circuitry, here functionally illustrated as a switch 30a-b, for allowing controllable discharge of the feedback capacitor 29a-b. The charge amplifier 18a-b may be reset by operating the reset circuitry 30a-b to discharge the feedback capacitor 29a b.

As is often the case for an op amp 24a-b in a negative feedback configuration, the voltage at the first input 25a-b follows the voltage at the second input 26a-b. Depending on the particular amplifier configuration, the potential at the first input 25a b may be substantially the same as the potential at the second input 26 a b, or there may be a substantially fixed offset between the potential at the first input 25a b and the potential at the second input 26 a b. In the configuration of FIG. 3, the first input 25 a b of the charge amplifier is virtually grounded.

When a time-varying potential is provided to the finger 15 by the excitation signal providing circuitry 19, a corresponding time-varying potential difference occurs between the sensing structure 17 a b and the finger 15.

The above-described change in potential difference between the finger 15 and the sensing structure 17a-b results in a sensing voltage signal $V_s$ on the output 27a-b of the charge amplifier 18a-b.

When the indicated sensing element 13 a b is selected for sensing, the selection switch 21a b is closed to provide the sensing signal to the readout line 33. The readout line 33, which may be a common readout line for a row or a column of the sensor array 5 in FIG. 2, is shown in FIG. 3 to be connected to a multiplexer 36. As is schematically indicated in FIG. 3, additional readout lines from other rows/columns of the sensor array 5 may also be connected to the multiplexer 36.

The output of the multiplexer 36 is connected to a sample-and-hold circuit 37 and an analog-to-digital converter 38 in series for sampling and converting the analog signals originating from the sensing elements 13 a b to a digital representation of the fingerprint pattern of the finger 15 on the sensor 2.

As is schematically indicated in FIG. 3, the finger detection circuit 12 here comprises a dedicated finger detecting structure 11b in the form of a metal plate, a charge amplifier 40 and a detection signal processing circuit 41. The charge amplifier 40, which is similar in principle to the charge amplifiers 18a b comprised in the sensing elements 13a b described above. Accordingly, the charge amplifier 40 comprises at least one amplifier stage, here schematically illustrated as an operational amplifier (op amp) 44 having a first input (negative input) 45 connected to the finger detecting structure 11b, a second input (positive input) 46 connected to sensor ground or another reference potential, and an output 47. In addition, the charge amplifier 40 comprises a feedback capacitor 49 connected between the first input 45 and the output 47, and reset circuitry, here functionally illustrated as a switch 50, for allowing controllable discharge of the feedback capacitor 49. The charge amplifier may be reset by operating the reset circuitry 50 to discharge the feedback capacitor 49. As is also indicated in FIG. 3, the output of the charge amplifier is a finger detection signal $S_d$ (in the form of a voltage) indicative of the capacitive coupling between the finger 15 and the finger detecting structure 11b.

In FIG. 3, the finger 15 is shown as being connected to an excitation circuit 19 for providing the desired potential difference between the finger, and the sensing plates 17a b of the sensor array 5 and the finger detecting structure 4a. It should be noted that this desired potential difference may alternatively be provided by changing the ground level of the fingerprint sensing device in relation to the ground level of the electronic device (such as mobile phone 1) in which the fingerprint sensing device 3 is included.

An exemplary embodiment of the method according to the present invention will now be described with reference to the schematic in FIG. 4 together with the illustrations in FIG. 2 and FIG. 3.

In FIG. 5, different exemplary functional states of the electronic device 1 are shown. In different functional states, the electronic device 1 consumes different amounts of current (for processes and devices related to fingerprint acquisition and authentication). This is schematically indicated in FIG. 4 by arranging the boxes representing different functional states at different positions. In this particular example, it is assumed that the display of the electronic device (such as mobile phone 1) is currently not active, and, as was mentioned above, the current consumption resulting from other processes, such as communication taking place in the background, GPS-related processes etc. is disregarded.

Below the lower dashed line 55, the fingerprint sensing device 3 is in its inactive state, and the processing circuitry 7 of the electronic device 1 is not performing any fingerprint-related processes. Between the lower dashed line 55 and the upper dashed line 56, the fingerprint sensing device 3 is in its active state and the processing circuitry 7 performs fingerprint-related processes. Above the upper dashed line 56, the processing circuitry 7 has additionally activated the user interface circuitry 6 (such as a display).

Assuming that the mobile phone 1 is initially inactivated and in a pocket or purse of the user, the display and the fingerprint sensor 3 are assumed to be inactive. The mobile phone 1 will then be in the 'Finger Detect' state 100. In this state, the fingerprint sensor 3 is in its inactive state with, in this particular example, only the finger detecting circuitry periodically active for detecting if a finger candidate is touching the sensing surface of the fingerprint sensor 3.

When it is determined by the finger detection circuit 12 that a finger candidate is touching the sensor surface, the finger detection circuit provides a Finger Detect signal as an interrupt output on the finger detection output 14 of the fingerprint sensor 3. The Finger Detect signal transitions the mobile phone 1 to the 'Image Capture' state 101. In this state, the (fingerprint processing part of) the processing circuitry 7 of the mobile phone 1 is activated. The processing circuitry 7 in turn controls the fingerprint sensor 3 from its inactive state to its active state and controls the fingerprint sensor 3 to acquire a first candidate representation (such as a full or partial digital image) of the finger candidate touching the sensor 3. Alternatively, the fingerprint sensor 3 may wake itself up in response to the Finger Detect to be ready to receive a command to provide the above-mentioned first candidate representation.

When the first candidate representation has been acquired, the mobile phone 1 is transitioned to the 'Image Qualification' state 102, where the processing circuitry 7 determines if it is likely that the first candidate representation is a representation of a fingerprint pattern. There are various ways of doing this. For instance, the presence of ridges with a reasonable ridge-to-ridge distance may be sufficient to qualify the first candidate representation as being likely to be a representation of a fingerprint pattern. If the 'Finger Detect' signal is triggered by something else than a finger, such as a coin or another part of the user's skin than the fingertip, there would be not ridges with the expected ridge-to-ridge distance, and the first candidate representation would not be qualified.

Taking first the case that the first candidate representation is considered not to be likely to originate from a fingerprint, the mobile phone 1 transitions to the 'Finger Lost' state 103. This is indicated by the label 'Not Qualified' on the line from the 'Image Qualification' state 102 to the 'Finger Lost' state 103.

In the 'Finger Lost' state 103, the fingerprint sensor 3 is in its inactive state and the finger detection circuit 12 is active (at least intermittently) to detect if a finger candidate touches the sensing surface of the fingerprint sensor 3 and to provide a Finger Lost signal when the finger candidate no longer touches the sensing surface.

When the Finger Lost signal is provided by the finger detection circuitry 12, the electronic device 1 is transitioned from the 'Finger Lost' state 103.

Figure 4:
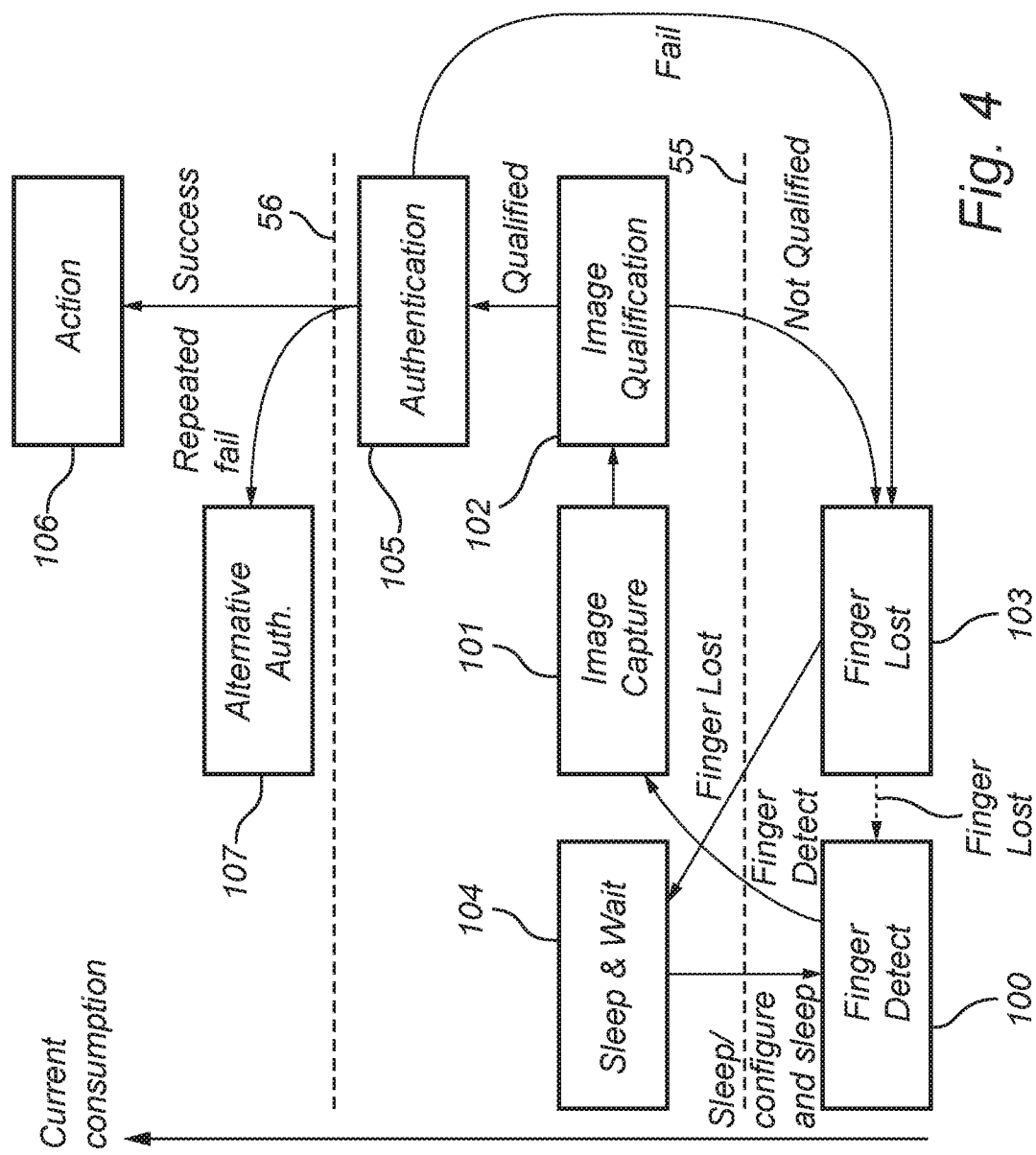
FIG. 4 schematically illustrates a method according to an embodiment of the present invention.

According to one embodiment, indicated by the solid line in FIG. 4, the electronic device 1 transitions to the 'Sleep & Wait' state 104, where the processing circuitry 7 temporarily controls the fingerprint sensor 3 to its active state, configures the fingerprint sensor 3 (the finger detection circuit 12) to signal a new finger candidate touch and transitions the fingerprint sensor 3 back to its inactive state. Hereby, the electronic device 1 has returned to the above-described 'Finger Detect' state 100.

According to another embodiment, indicated by the dashed line in FIG. 4, the electronic device 1 transitions directly to the above-described 'Finger Detect' state 100 when the Finger Lost signal is provided.

Returning to the description of the 'Image Qualification' state 102 further above, finding that the acquired first candidate representation (image) can be qualified as a likely finger, results in the electronic device 1 transitioning to the 'Authentication' state 105. In the 'Authentication' state 105, an enrolment representation of the candidate finger is retrieved from memory and an authentication representation of the candidate finger is formed based on the candidate representation. The authentication representation is compared with the enrolment representation to arrive at an authentication result. Various procedures for forming an authentication representation and comparing the authentication representation with a stored enrolment representation are well-known to those skilled in the art.

In the case of a failed authentication, indicated by 'Fail' in FIG. 4, the electronic device 1 is transitioned to the 'Finger Lost' state 103 as described above.

In the case of a successful authentication, indicated by 'Success' in FIG. 4, the electronic device 1 is transitioned to the 'Action' state 106, in which the display (or other user interface circuitry) is activated to communicate the authentication result to the user and to carry out the task requiring a successful authentication.

In the case of several failed authentication attempts in sequence, the electronic device may transition to the 'Alternative Authentication' state 107, in which the display (or other user interface circuitry) is activated to communicate the authentication result to the user and to request the user to authenticate using alternative means, such as by entering a PIN-code.

Through embodiments of this method, the fingerprint sensor 3 and other parts of the electronic device 1 can be kept in a low-power mode during longer periods, resulting in a lower energy consumption of the electronic device over time. For instance, as was described further above, the fingerprint sensor 3 can be directly transitioned to its inactive state in the case of a non-qualified candidate representation or a failed authentication etc., and can be allowed to stay there until the finger candidate is removed from the sensing surface of the fingerprint sensor 3.

The Finger Detect and Finger Lost signals can be provided in various different ways depending on the requirements of the particular application. The actual detection of the presence of a finger candidate can either be purely analog, or based on a digital signal. Furthermore, the detection of the presence of the finger candidate may advantageously be intermittent, and the determination of the Finger Detect and Finger Lost signals may be based on several consecutive detection events to increase the reliability of the detection.

In the following, two examples of the determination of the Finger Detect signal and the Finger Lost signal by the finger detection circuit 12 will be described with reference to FIG. 5 and FIG. 6. In these examples, the finger detection is directly based on a detection signal $S_d$ that indicates the capacitive coupling between the finger 15 and the detection structures 11a b (referring to FIG. 2 and FIG. 3).

In each of FIG. 5 and FIG. 6, the finger detection signal $S_d$ is shown to vary over time in relation to a threshold value TH indicating a threshold capacitive coupling between the finger detecting structures 11a 2 and the finger 15 (or other object). In each of FIG. 5 and FIG. 6, a higher value of the finger detection signal $S_d$ indicates a stronger capacitive coupling. It should be noted that this is merely an illustrative example, and that there may be another relation between the finger detection signal and the above-mentioned capacitive coupling. For instance, a lower value of the finger detection signal $S_d$ may indicate a weaker capacitive coupling depending on the configuration of the finger detection circuit 12.

Referring first to FIG. 5, the finger detection signal processing circuit 41 (FIG. 3) samples the finger detection signal $S_d$ at times schematically indicated by the numbers (0-4) in FIG. 5. These numbers indicate a filter function used to achieve a higher reliability in the Finger Detect and Finger Lost signals. For the Finger Detect signal (the upper interrupt (IRQ) signal labelled 'Finger Detect' in FIG. 5) the consecutive samples when the finger detection signal $S_d$ is above the detection threshold TH are counted. When the finger detection signal $S_d$ has been above the detection threshold TH for 4 consecutive detection events, the Finger Detect signal goes from 'low' to 'high' to indicate that a finger candidate is touching the sensing surface of the fingerprint sensor 3.

Analogously, for the Finger Lost signal (the lower interrupt (IRQ) signal labelled 'Finger Lost' in FIG. 5) the consecutive samples when the finger detection signal $S_d$ is below the detection threshold TH (when the electronic device 1 is in the 'Finger Lost' state) are counted. When the finger detection signal $S_d$ has been below the detection threshold TH for 4 consecutive detection events, the Finger Lost signal goes from 'low' to 'high' to indicate that the finger candidate is no longer touching the sensing surface of the fingerprint sensor 3.

Another way of providing the Finger Detect signal and the Finger Lost signal is schematically illustrated in FIG. 6, where a 'Finger Present' signal indicates both Finger Detect and Finger Lost. When the detection signal $S_d$ is above the detection threshold TH, the Finger Present signal goes high, and remains high until the detection signal $S_d$ goes below the detection threshold TH.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A fingerprint sensing device for sensing a fingerprint pattern of a finger touching a sensing surface of said fingerprint sensing device, and providing a representation of the fingerprint pattern, said fingerprint sensing device comprising:
   an array of sensing elements for sensing said fingerprint pattern;
   readout circuitry connected to said array of sensing elements; and
   finger detecting circuitry for detecting if a finger candidate is touching the sensing surface of said fingerprint sensing device,
   said fingerprint sensing device being controllable between an active state with an active state energy consumption and an inactive state with an inactive state energy consumption lower than said active state energy consumption, wherein:
      when said fingerprint sensing device is in said active state, each sensing element in said array of sensing elements is controllable to provide a sensing signal indicating a local distance between said finger and said sensing element;
   and said finger readout circuitry is controllable to read out said sensing signals from each of said sensing elements and provide said representation of the fingerprint pattern based on the sensing signals from said sensing elements; and
      when said fingerprint sensing device is in said inactive state, said finger detecting circuitry is configured to provide a finger candidate lost signal for indicating when said finger candidate no longer touches the sensing surface of said fingerprint sensing device.

2. The fingerprint sensing device according to claim 1, wherein:
   when said fingerprint sensing device is in said inactive state, said finger detecting circuitry is configured to provide said finger candidate lost signal for indicating when said finger candidate has been removed from the sensing surface of said fingerprint sensing device such that a minimum distance between said finger candidate and said sensing surface is at least one millimeter.

3. The fingerprint sensing device according to claim 1, wherein:
   when said fingerprint sensing device is in said inactive state, said finger detecting circuitry is further configured to provide a finger detect signal for indicating when said finger candidate is touching the sensing surface of said fingerprint sensing device.

4. The fingerprint sensing device according to claim 1, wherein said fingerprint sensing device comprises a finger detection output for externally providing said finger candidate lost signal.

5. The fingerprint sensing device according to claim 1, wherein said finger detecting circuitry is configured to detect if said finger candidate is touching the sensing surface of said fingerprint sensing device at discrete detecting events.

6. The fingerprint sensing device according to claim 5, wherein said finger candidate lost signal is only provided when said finger detecting circuitry detects that said finger candidate no longer touches the sensing surface of said fingerprint sensing device at at least two consecutive detecting events.

7. The fingerprint sensing device according to claim 1, wherein said sensing signal from each of said sensing elements indicates a capacitive coupling between said finger and said sensing element.

8. The fingerprint sensing device according to claim 1, wherein said fingerprint sensing device further comprises an electrically conductive finger detecting structure; and
   wherein said finger detecting circuitry is configured to:

provide said finger candidate lost signal in response to said capacitive coupling between said finger detecting structure and said finger candidate changing from a first value above a threshold capacitive coupling to a second value below said threshold capacitive coupling.

9. The fingerprint sensing device according to claim 8, wherein said first value is above a first threshold capacitive coupling, and said second value is below a second threshold capacitive coupling, said second threshold capacitive coupling being weaker than said first threshold capacitive coupling.

10. An electronic device comprising:
a fingerprint sensing device according to claim 1;
processing circuitry for controlling operation of said electronic device; and
a fingerprint sensor interface for allowing said processing circuitry to control operation of said fingerprint sensing device,
wherein said processing circuitry is configured to:
control said fingerprint sensing device to provide a first candidate representation of a finger candidate to said processing circuitry via said fingerprint sensor interface;
evaluate said first candidate representation; and
control, when the evaluation indicates that said finger candidate cannot be qualified as a finger, said fingerprint sensing device to provide a second candidate representation of the finger candidate only after said finger detecting circuitry has provided said finger candidate lost signal.

11. The electronic device according to claim 10, wherein said processing circuitry is further configured to control said fingerprint sensing device to its inactive state when the evaluation indicates that said finger candidate cannot be qualified as a finger.

12. The electronic device according to claim 10, wherein:
said fingerprint sensing device comprises a finger detection output for externally providing said finger candidate lost signal; and
said processing circuitry is connected to said finger detection output for receiving said finger candidate lost signal.

13. The electronic device according to claim 10,
wherein said electronic device further comprises a display device; and
wherein said processing circuitry is further configured to:
when the evaluation indicates that said finger candidate can be qualified as a finger:
retrieve a stored enrolment representation;
form an authentication representation based on the first candidate representation;
compare said enrolment representation and said authentication representation; and
when said comparison indicates successful authentication:
activating said display device; and
controlling said display device to indicative said successful authentication to a user.

14. A method of controlling operation of a fingerprint sensing device comprising finger detecting circuitry, said fingerprint sensing device being controllable between an active state with an active state energy consumption and an inactive state with an inactive state energy consumption lower than said active state energy consumption,
wherein the method comprises the steps of:
detecting, when said fingerprint sensing device is in its inactive state, using said finger detecting circuitry, if a finger candidate is touching a sensing surface of said fingerprint sensing device;
providing, when said finger candidate is touching the sensing surface of said fingerprint sensing device, a finger detect signal; and
providing, when said finger candidate no longer touches the sensing surface of said fingerprint sensing device, a finger candidate lost signal.

15. A method of controlling an electronic device including:
a fingerprint sensing device for sensing a fingerprint pattern of a finger touching a sensing surface of said fingerprint sensing device, said fingerprint sensing device being controllable between an active state with an active state energy consumption and an inactive state with an inactive state energy consumption lower than said active state energy consumption;
processing circuitry for controlling operation of said electronic device; and
a fingerprint sensor interface for allowing said processing circuitry to control operation of said fingerprint sensing device, said method comprising the steps of claim 14, and further comprising the steps of:
controlling said fingerprint sensing device to provide a first candidate representation of a finger candidate to said processing circuitry via said fingerprint sensor interface;
evaluating said representation of the fingerprint pattern; and
controlling, when the evaluation indicates that said finger candidate cannot be qualified as a finger, said fingerprint sensing device to provide a second candidate representation of the finger candidate only after said finger detecting circuitry has provided said finger candidate lost signal.

* * * * *